April 25, 1967 R. M. BERMAN ETAL 3,316,491
HEARTBEAT WAVEFORM SIMULATOR
Filed Aug. 8, 1962 2 Sheets-Sheet 1

INVENTORS
Richard M. Berman
Lyman W. Bethke,
Bernard Schwartz
BY Paris, Haskell and Levine
ATTORNEYS

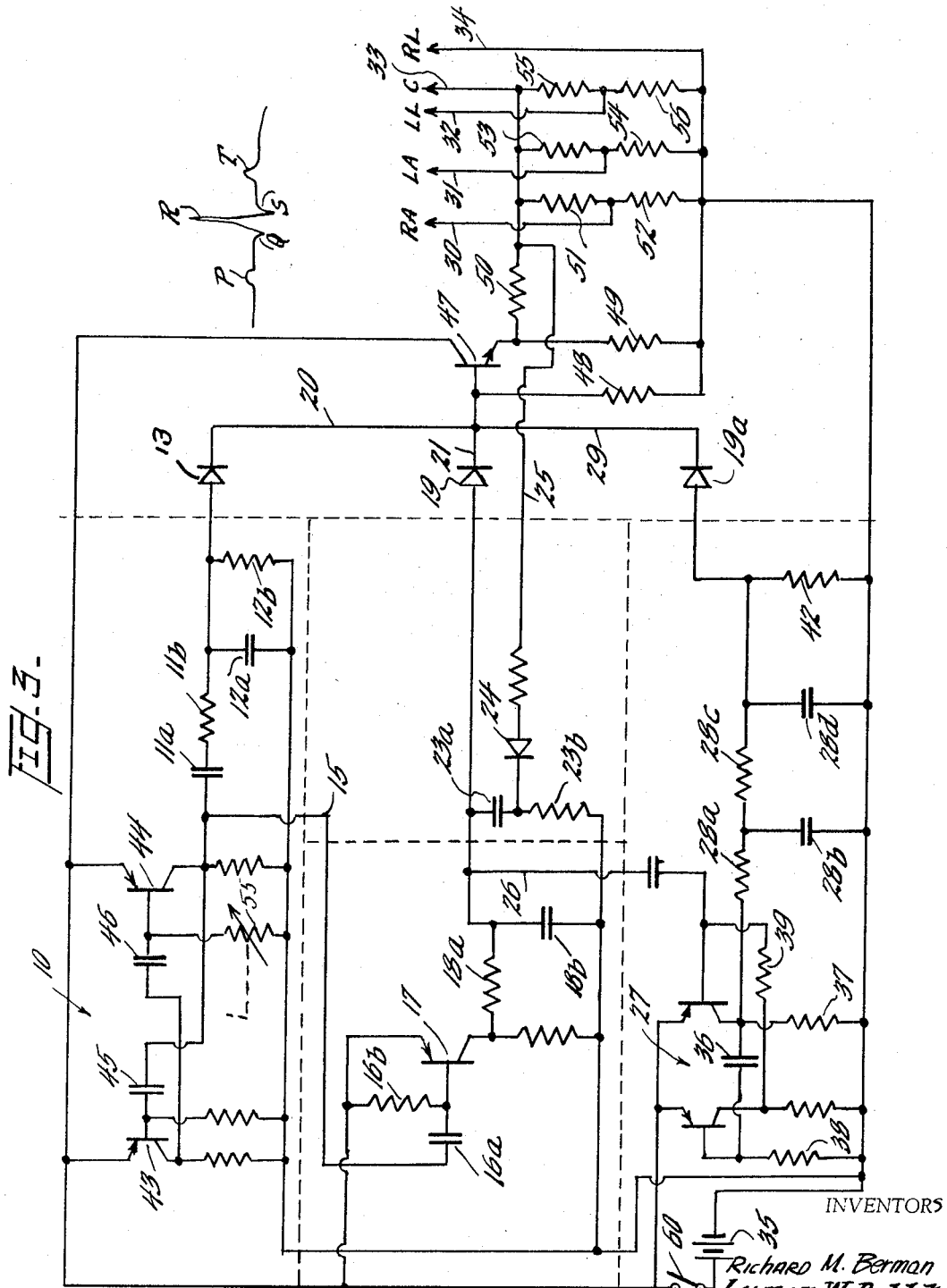

United States Patent Office 3,316,491
Patented Apr. 25, 1967

3,316,491
HEARTBEAT WAVEFORM SIMULATOR
Richard M. Berman, Philadelphia, Pa., and Bernard Schwartz, Springfield, and Lyman W. Bethke, Trenton, N.J., assignors, by mesne assignments, to United Aircraft Corporation, a corporation of Delaware
Filed Aug. 8, 1962, Ser. No. 215,684
7 Claims. (Cl. 328—62)

This invention relates generally to medical simulators for producing electrical waveforms representing those produced by a normal or abnormal organism of a living human or animal, and has for a principal object to provide such a simulator that is comprised exclusively of electronic components, having no mechanically moving parts, and that may be battery powered and capable of being embodied in a miniature, lightweight pacage for easy portability and wide utility for such purposes as instruction and testing, among others.

A further object is to provide a heart wave simulator for repetitively producing simulated heart waveforms, and being adjustable to control the repetition rate of the heartbeat waveforms.

Still another object is to provide such an electronic physiological waveform generator employing predominantly passive electrical circuit networks and having a very low current drain, whereby the generator may be battery powered and used continuously for long time periods without the need for replacing or recharging the batteries.

A still further object is to provide such an electronic heart possessing a minimum of miniaturized electrical components and capable of being packaged within a housing small enough to easily fit within the human hand.

Figure 1:
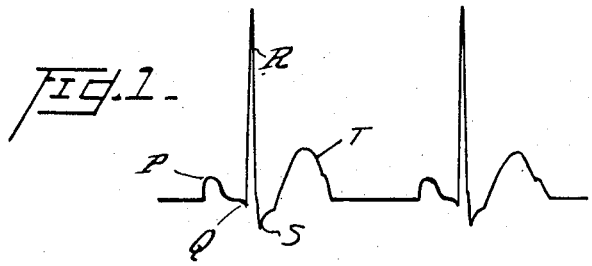
Figure 2:
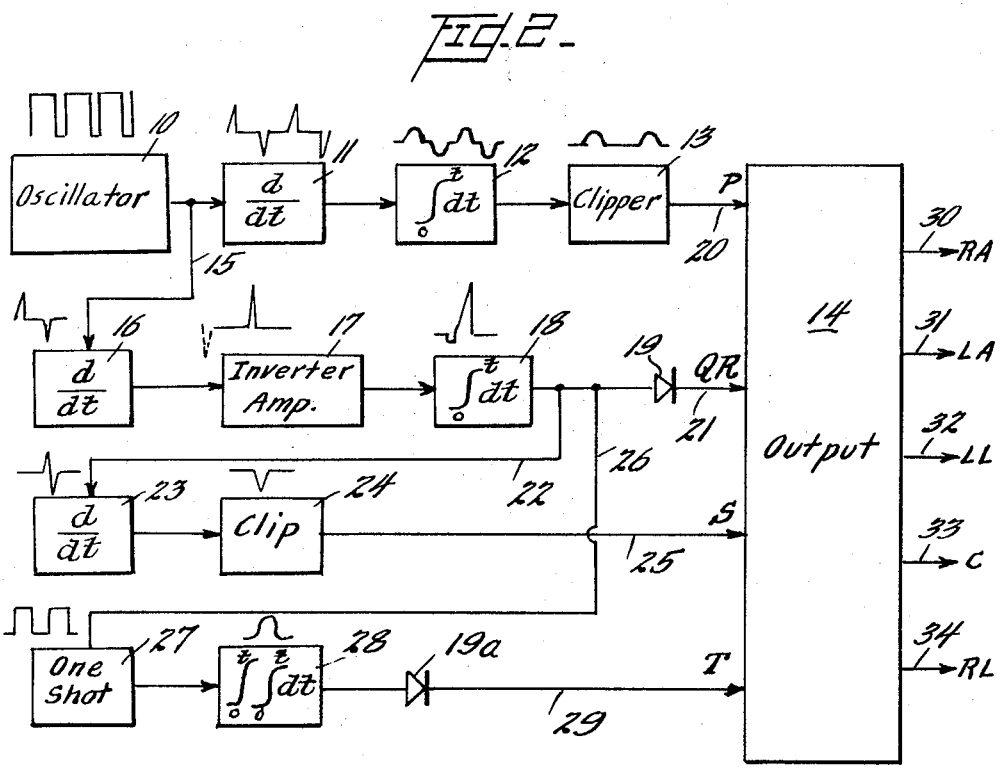

Other objects and additional advantages will be more readily understood by those skilled in the art after detailed consideration of the following specification taken with the accompanying drawing wherein:

FIG. 1 is an illustrated waveform of a typical living heart wave as simulated by the present invention, FIG. 2 is an electrical block diagram showing the functional circuitry employed according to a preferred embodiment of the invention, and FIG. 3 is a schematic electrical circuit illustrating a preferred electronic heart wave simulator circuit corresponding to the block diagram of FIG. 2.

Referring now to the drawings, there is shown in FIG. 1 a pair of typical waveforms of the type repetitively produced by the human heart and commonly referred to in the medical profession as a PQRST wave, with the letters P to T, inclusive, referring to the component parts of the wave and with each such part generally having the particular waveshape as shown. By the use of an electrocardiograph apparatus the physician obtains such a waveform from the patient and can determine a great deal about the functioning and condition of the patient from such factors as the heartbeat rate, and the shape and amplitude of these component parts of the wave.

It is the purpose of the present invention to provide an electronic device that produces such a typical heart waveform for use by the physician in testing his cardiograph apparatus, oscilloscope, magnetic tape recorder and the like, and for various other purposes such as the teaching and instruction of medical students and technicians, as well as use in the manufacture, testing, and quality control of the above apparatus.

FIG. 2 functionally illustrates a preferred electronic circuit for producing the heart waveform of FIG. 1 as an electrical signal. As shown, the circuit preferably comprises an adjustable frequency oscillator 10, of the multivibrator variety, for repetitively producing uniform waveshape impulses, together with a series of wave shaping circuit channels that are powered by the oscillator pulses to individually produce the different component wave parts P to T, inclusive, of the PQRST wave in FIG. 1, in response to each one of the oscillator pulses.

Considering each of these wave shaping channels in order, the uppermost horizontal channel in FIG. 2 produces the P wave component, and comprises a differentiating circuit 11, followed by an integrating circuit 12 and finally a clipper circuit 13. The differentiating circuit 11 produces differentiated spike pulses of opposite polarity at the leading edge and trailing edge of each oscillator pulse. These spikes are integrated by circuit 12 to provide opposite polarity low amplitude rounded waveshape components, resembling the P component, at both the leading and trailing edges of each oscillator pulse. In the clipper circuit 13, the negative polarity P component is removed to provide a repetitive series of P wave components over line 20 leading from the first channel with each P component being synchronized to occur after the leading edge of each oscillator pulse.

The next waveshaping channel for producing the Q and R component, similarly comprises a differentiating circuit 16 for producing opposite polarity spikes at the leading and trailing edges of each oscillator pulse, and the trailing edge spike is inverted in polarity and amplified by the amplifier 17, to provide an amplified positive spike at the trailing edge of each oscillator pulse. These amplified positive polarity spikes are then integrated by integrator 18 to broaden the base of the spike and otherwise shape the amplified spikes into the waveshape of the R component. The resulting waveform simulates the QR wave component and occurs in predetermined time delayed relationship to the P wave by reason of using only the trailing edge spike of each oscillator pulse.

For generating the remaining S and T components in succeeding time phase with the R component, the remaining two waveshaping channels are energized by the output of the QR channel and therefore produce their components in given phase delayed relation after the R component.

As shown, the S waveshaping channel is energized over line 22 by the R wave obtained from the integrator circuit 18. This R waveform is differentiated by differentiator 23 to generate small negative and positive pulses in response to each R wave, which are phased at the beginning and end of the R wave. The positive spike produced at the beginning of the R wave is rejected by the clipper circuit 24 and the negative going spike passes over line 25 to provide the negative going S wave component of FIG. 1 after the occurrence of the R wave.

The remaining and lowest channel for producing the T component is comprised of a uniform pulse former circuit or one shot multivibrator 27, and a double integrating circuit 28 for rounding the edges of the uniform pulses produced to simulate the larger T wave component of FIG. 1. The double integration also delays the T wave component to occur in the proper phase after the S component.

The one shot pulse circuit 27 is energized over line 26 by each R wave to produce a basic T component pulse of the proper relative amplitude after each such R wave and these basic T pulses are thereafter shaped and time delayed by the double intergrator 28 to provide the desired T component signal over output line 29.

All of the P, QR, S, and T components being produced over output lines 20, 21, 25 and 29 are then combined in an output circuit 14 which may be characterized as an isolator and attenuator circuit to combine these wave components without permitting feedback of the signal components from one wave shaping circuit channel to the next. This output circuit 14 further includes an attenuating network having a series of output lines 30 to 34, inclusive, on each of which the combined PQRST waveform is reproduced in identical waveform but at a different relative amplitude level to simulate the attenuation of the signal at different parts of the body. For example, there is produced at the output terminal line 33, representing the chest (C) a larger amplitude signal than at the line 34 simulating that obtained at the right leg (RL). Similarly the PQRST signals at the terminal 30 and simulating the amplitude level at the right arm differs from that at line 31 simulating that obtainable at the left arm of the patient. In this manner, there is obtained at each output line 30 to 34, the same PQRST wave but at a different amplitude level simulating the relative amplitudes obtained at different parts of the human body.

FIG. 3 illustrates circuit details of the preferred embodiment of FIG. 2, and employing a minimum number of miniaturized solid state electrical components, all adapted to be energized by a small portable battery 35.

As shown, the oscillator circuit 10 comprises a multivibrator having a pair of transistors 43 and 44 interconnected in mutual feedback relationship by means of time constant circuits employing capacitors 45 and 46. As is known to those skilled in the art, the proper selection of these components provides an astable oscillator producing essentially square wave impulses at the collector electrode of transistor 44. For adjustably varying the frequency of oscillation, thereby to vary the repetition rate of the simulated heartbeats, the resistor 55 is made adjustably variable to change the time constant.

Alternatively, as is now considered evident, the variable resistor 55 may be replaced by a series of fixed resistors of different values (not shown) together with a selector switch for selectively inserting different valued resistors in the circuit. This permits the oscillator frequency to be adjusted in discrete steps rather than being continuously adjustable as shown by the variable resistor 55.

In the first channel, the oscillator pulses are differentiated and then integrated, as previously described, by a resistor-capacitance network comprising capacitor 11a, resistor 11b, capacitor 12a and resistor 12b. Finally, the diode 13 provides the clipping action enabling only the positive going shaped P components to be produced over line 20.

In the second channel, the oscillator pulses are directed over line 15 and are passed through a capacitor 16a and resistor 16b in a differentiating network, and the differentiated spikes obtained are directed to energize the base electrode of transistor 17 connected as an inverter amplifier. The transistor 17 is biased to amplify only the trailing edge spikes (negative) and its output energizes an integrating network comprised of resistor 18a and capacitor 18b. The integrated spiked waveform on capacitor 18b is then clipped by diode 19 to provide, strictly speaking, only the desired R signal components over line 21. The Q component is usually very small in amplitude compared to the R wave and consequently the R wave produced may be made to simulate quite closely the QR wave.

In the third channel, the R signal component being obtained across capacitor 18b is also differentiated by the capacitor 23a and resistor 23b, in a series network, and only the negative going spikes are passed by reversely poled diode 24 to provide the negative S signal component on line 25 that occurs at the trailing edge of the R wave.

In the fourth and final wave shaping channel, the R signal component obtained across capacitor 18b is also directed over line 26 and differentiated by a capacitor and resistor 39 to trigger a one shot multivibrator circuit 27, including a pair of interconnected transistors, thereby to produce a uniform waveshape impulse of preselected energy content corresponding to the T wave component and occurring after the generation of each R wave component. This uniform pulse is then directed to a pair of integrating circuits in cascade comprising resistor 28a and capacitor 28b, and resistor 28c and capacitor 28d, where this uniform pulse is doubly integrated to shape its contour into the desired T component configuration and properly delay this component to occur after the S component. The T component is also directed through a diode 19 to prevent feedback of the waveforms from the other channels into the last channel.

For combining the individually wave shaped components into the composite PQRST wave, the output lines 20, 21, and 29 leading from the P, QR, and T channels are directed to a common junction energizing the base electrode of transistor 47. Transistor 47 is connected as an emitter follower-circuit with resistors 48 and 49, to provide a high input impedance for isolating the wave component forming channels from the output circuit. Consequently, at the emitter of transistor 47 there is provided the composite P, QR, and T components but not the negative going S component wave.

It will be noted that each of the P, QR, and T components are positive going signals and are applied to the common junction at transistor 47 through diodes 13, 19 and 19a, respectively, whereby no one of these channels may feed back a signal into the others. The S signal component on the other hand is negative going, and to prevent its feedback into the other channels it is combined in the output circuit of transistor 47, specifically, being directed over line 25 to the opposite end of resistor 50 as shown. In this manner, this S component is blocked from feedback back through the diodes 13, 19, and 19a to the other channels. Thus at the opposite terminal of resistor 50, there is provided the complete simulated PQRST wave as generally shown in FIG. 1.

For simulating the different amplitudes of the PQRST wave as would be obtained from different parts of the human body, the PQRST signal obtained from the circuit is then directed to a series of three parallel arranged resistor potential dividers, comprising resistors 51 to 56, inclusive. The relative values or ratios of these potential divider circuits are weighted or adjusted corresponding to the typical attenuations of the PQRST waves at different parts of the human body. For example, the signal obtained from the chest position (C) close to the heart is at the strongest level and consequently, the output line 33 representing or simulating this amplitude is at the highest level, being taken directly from the output of resistor 50. In a similar manner, the potential divider paths are adjusted or weighted in such fashion that the simulated output at the right arm (RA) over line 30 is at a given ratio of amplitude to the simulated chest output on line 33 and similarly the simulated left arm output on line 31, the simulated left leg output at line 32, and right leg output at 34 are all in given preselected amplitude ratio to the chest signal on 33 as is desired.

Although but one preferred embodiment of the invention has been illustrated and described, it is believed evident that many changes may be made without departing from the spirit and scope of the invention. Accordingly, this invention should be considered as limited only by the following claims.

What is claimed is:

1. In a heart wave generator for repetitively producing an electrical waveform simulating a PQRST wave,
a variable frequency oscillator having an adjustable control means for changing the frequency,
an electronic wave shaping circuit for producing an output signal simulating the P component,
a second electronic wave shaping circuit for producing an output signal simulating the QR component,
and
a third and fourth electronic wave shaping circuit for producing output signals simulating the S and T components, respectively,
all of said wave shaping circuits being energized during each cycle of operation of the oscillator to produce their respective signal components in the time phase of the simulated PQRST heart wave, and output means for combining the signals produced by said wave shaping circuits to produce the composite PQRST wave, said output means including means for preventing the feedback of each of said output signals into the others.

2. In the generator of claim 1, a weighted impedance network energized by the output means and having a plurality of output terminals for selectively attenuating the composite electrical signal to simulate the heart wave relative amplitudes produced at different portions of the human body.

3. A heart wave generator for producing a PQRST wave comprising:

an adjustable frequency oscillator, a first wave shaping circuit for producing at the output thereof a wave simulating the P component, said first wave shaping circuit including in cascaded relationship a differentiating circuit, an integrating circuit, and a unidirectional clipper circuit, a second wave shaping circuit for producing at the output thereof a wave simulating the QR component, said second wave shaping circuit including a differentiating circuit, a polarity inverting circuit and an integrating circuit, said first and second wave shaping circuits being energized directly by said oscillator to produce a P wave component and QR wave component in delayed phase sequence, respectively, and third and fourth wave shaping circuits for producing at the outputs thereof a wave simulating the S component and a wave simulating the T component, respectively, said third and fourth wave shaping circuits being energized by the second wave shaping circuit, and unidirectional coupling means for combining the wave components produced by all said wave shaping circuits to produce a composite PQRST wave.

4. In the generator of claim 3, an output attenuating circuit being energized by said unidirectional coupling means and having a plurality of output terminals for selectively producing different attenuations of the composite PQRST wave corresponding to those produce at different portions of the body.

5. In the generator of claim 3, said third wave shaping circuit including a differentiating circuit and a unidirectional clipping circuit, and said fourth wave shaping circuit including a uniform pulse forming circuit and a double intergrating circuit.

6. A miniaturized portable heart wave generator comprised exclusively of electronic components for repetitively producing an electrical waveform simulating a PQRST heart wave and being adjustable to vary the repetition rate of the produced waveform comprising:

an adjustable frequency multivibrator for repetitively producing uniform waveshape electrical impulses, a first passive circuit network for producing a P wave component at the beginning of each cycle of the oscillator, a second passive circuit network for producing a QR wave component in preset given phase relation after the production of each P wave component, a third passive circuit network for producing an S wave component in preset phase relation after the production of each R wave component, a fourth passive circuit network for producing a T wave component in preset phase relation after the production of each S component, and isolation circuit means for combining the produced PQRS and T components in an output circuit without mutual interference thereby to generate the simulated PQRST waveform.

7. A physiological waveform generator for producing a complex electrical waveform representing that produced by the heart of a living organism comprising:

an electronic oscillator, a plurality of electronic wave shaping circuits energized during each cycle of the oscillator in varying time phased relationship, each circuit producing a waveform simulating a component of the physiological waveform, and combining means responsive to all of said circuits for combining the component waves produced into the desired waveform, said combining means being coupled to the channels in such fashion that the component waveforms from each channel are isolated from feeding back into the other channels.

References Cited by the Examiner

UNITED STATES PATENTS

| | | | |
|---|---|---|---|
| 2,403,616 | 7/1946 | Sanders | 328—178 |
| 3,055,356 | 9/1962 | Choninard | 328—178 |

ARTHUR GAUSS, *Primary Examiner.*

J. HEYMAN, *Assistant Examiner.*